United States Patent
Gery et al.

(10) Patent No.: US 10,491,069 B2
(45) Date of Patent: Nov. 26, 2019

(54) ELECTRIC MOTOR WITH LAMINATED SHEET WINDINGS

(71) Applicant: GreenTech Motors Corporation, Westlake Village, CA (US)

(72) Inventors: Jean-Marc Gery, Los Angeles, CA (US); Dan Jones, Westlake Village, CA (US)

(73) Assignee: GreenTech Motors Corporation, Westlake Village, CA (US)

( * ) Notice: Subject to any disclaimer, the term of this patent is extended or adjusted under 35 U.S.C. 154(b) by 637 days.

(21) Appl. No.: 14/855,126

(22) Filed: Sep. 15, 2015

(65) Prior Publication Data

US 2016/0126794 A1    May 5, 2016

Related U.S. Application Data

(60) Provisional application No. 62/051,235, filed on Sep. 16, 2014.

(51) Int. Cl.
*H02K 3/00*    (2006.01)
*H02K 3/04*    (2006.01)
(Continued)

(52) U.S. Cl.
CPC ............. *H02K 3/04* (2013.01); *H02K 1/278* (2013.01); *H02K 1/2753* (2013.01);
(Continued)

(58) Field of Classification Search
CPC .. H02K 3/04; H02K 3/32; H02K 5/20; H02K 3/26; H02K 1/2753
(Continued)

(56) References Cited

U.S. PATENT DOCUMENTS 4,319,152 A * 3/1982 van Gils .................. H01F 27/24
310/201
5,289,066 A    2/1994 Clark
(Continued)

FOREIGN PATENT DOCUMENTS

EP    0691727 A1    1/1996

OTHER PUBLICATIONS

Foreign Office Action for counterpart Australian Patent Application 2015317785; dated May 23, 2019.

*Primary Examiner* — Hanh N Nguyen
(74) *Attorney, Agent, or Firm* — Ferguson Case Orr Paterson

(57) ABSTRACT

An electric machine employs laminated sheets windings (LSWs) and permanent magnets which rotate about the LSWs. A 'radial' embodiment employs magnets which are magnetized radially and LSWs laid parallel to the rotation axis. An 'axial' embodiment uses axially magnetized magnets with LSWs laid radially in the plane of the motor. The magnets may be arranged as Halbach arrays. Magnets and LSWs are arranged concentrically with an air gap therebetween; the motor may employ "Large Air Gap Electric Ring" (LAGER) technology. The laminated sheets form a continuous stack of series-connected concentric metal layers; dielectric layers insulate each metal layer from its adjacent layers. Cuts arranged periodically around each LSW run parallel to the rotation axis and extend through all of the metal layers, with adjacent cuts originating on opposite sides of the LSW such that they form a serpentine path for current to flow as it flows around the winding.

41 Claims, 10 Drawing Sheets

(51) Int. Cl.
  *H02K 21/12* (2006.01)
  *H02K 1/27* (2006.01)
  *H02K 3/26* (2006.01)
  *H02K 3/32* (2006.01)
  *H02K 5/20* (2006.01)
  *H02K 9/06* (2006.01)
  *H02K 15/03* (2006.01)
  *H02K 16/02* (2006.01)

(52) U.S. Cl.
  CPC ......... *H02K 1/2786* (2013.01); *H02K 1/2793* (2013.01); *H02K 3/26* (2013.01); *H02K 3/32* (2013.01); *H02K 5/20* (2013.01); *H02K 9/06* (2013.01); *H02K 21/12* (2013.01); *H02K 15/03* (2013.01); *H02K 16/02* (2013.01)

(58) Field of Classification Search
  USPC ...... 310/156.01–156.84, 179, 180, 198, 208, 310/60 R
  See application file for complete search history.

(56) References Cited

U.S. PATENT DOCUMENTS

| | | | |
|---|---|---|---|
| 5,604,390 A | 2/1997 | Ackermann | |
| 6,873,085 B2 | 3/2005 | Graham | |
| 7,265,470 B1 | 9/2007 | Paden | |
| 7,291,956 B2 * | 11/2007 | Itoh | H02K 3/26 310/208 |
| 7,598,646 B2 | 10/2009 | Cleveland | |
| 7,646,132 B2 * | 1/2010 | Halstead | H02K 3/04 310/156.32 |
| 8,009,001 B1 | 8/2011 | Cleveland | |
| 8,395,295 B2 | 3/2013 | Cleveland | |
| 8,405,479 B1 | 3/2013 | Cleveland | |
| 8,476,800 B2 * | 7/2013 | Lai | F04D 25/0606 310/179 |
| 8,536,970 B2 * | 9/2013 | Liang | H02K 3/26 310/208 |
| 9,960,655 B2 * | 5/2018 | Chen | H02K 5/225 |
| 2011/0057629 A1 | 3/2011 | Lin et al. | |

* cited by examiner

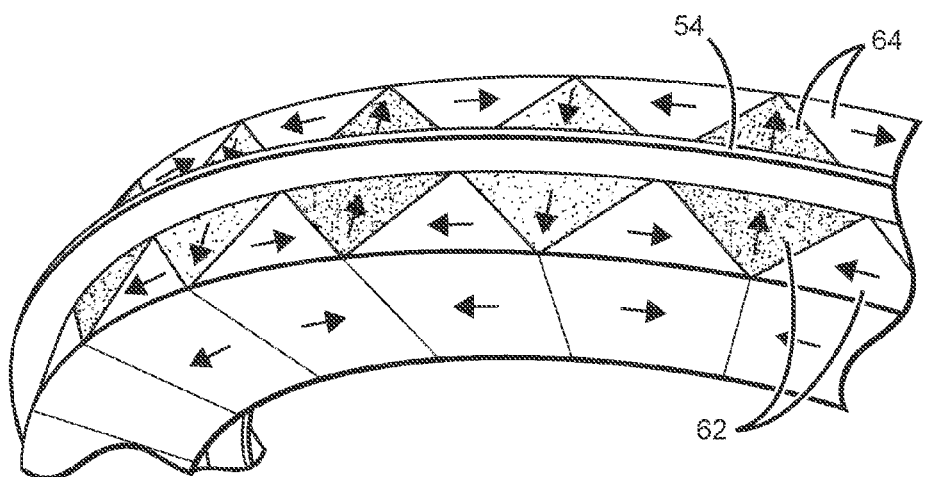
FIG. 8
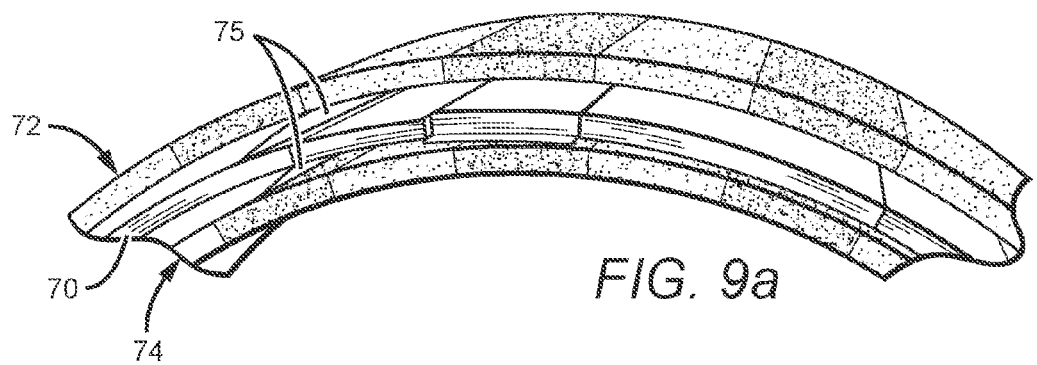
FIG. 9a
FIG. 9b
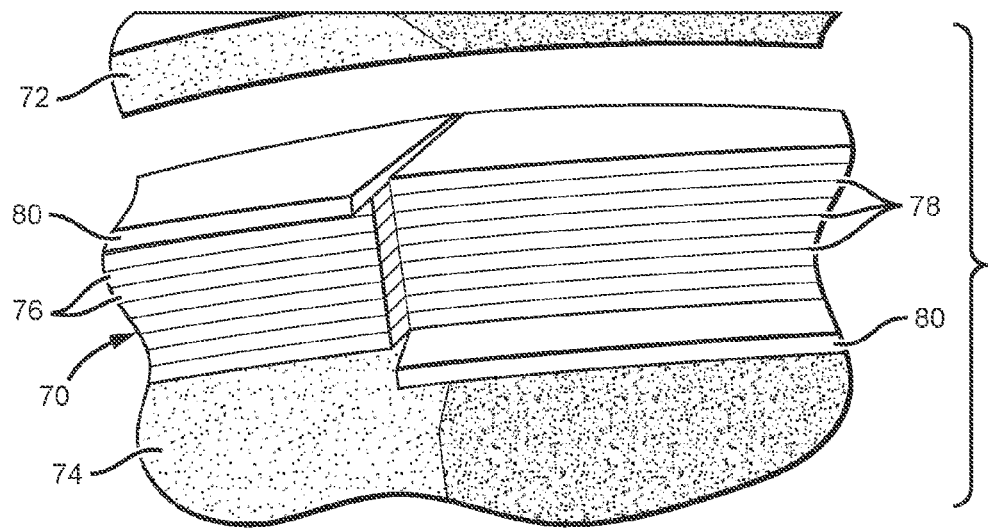

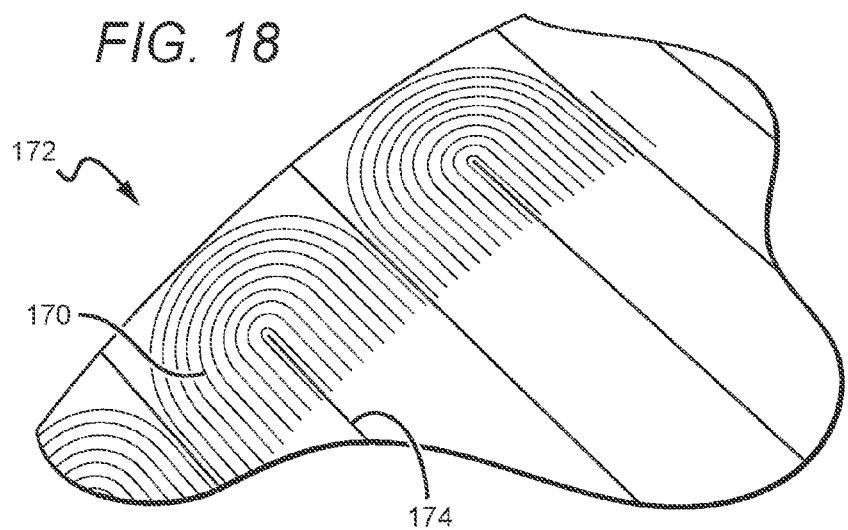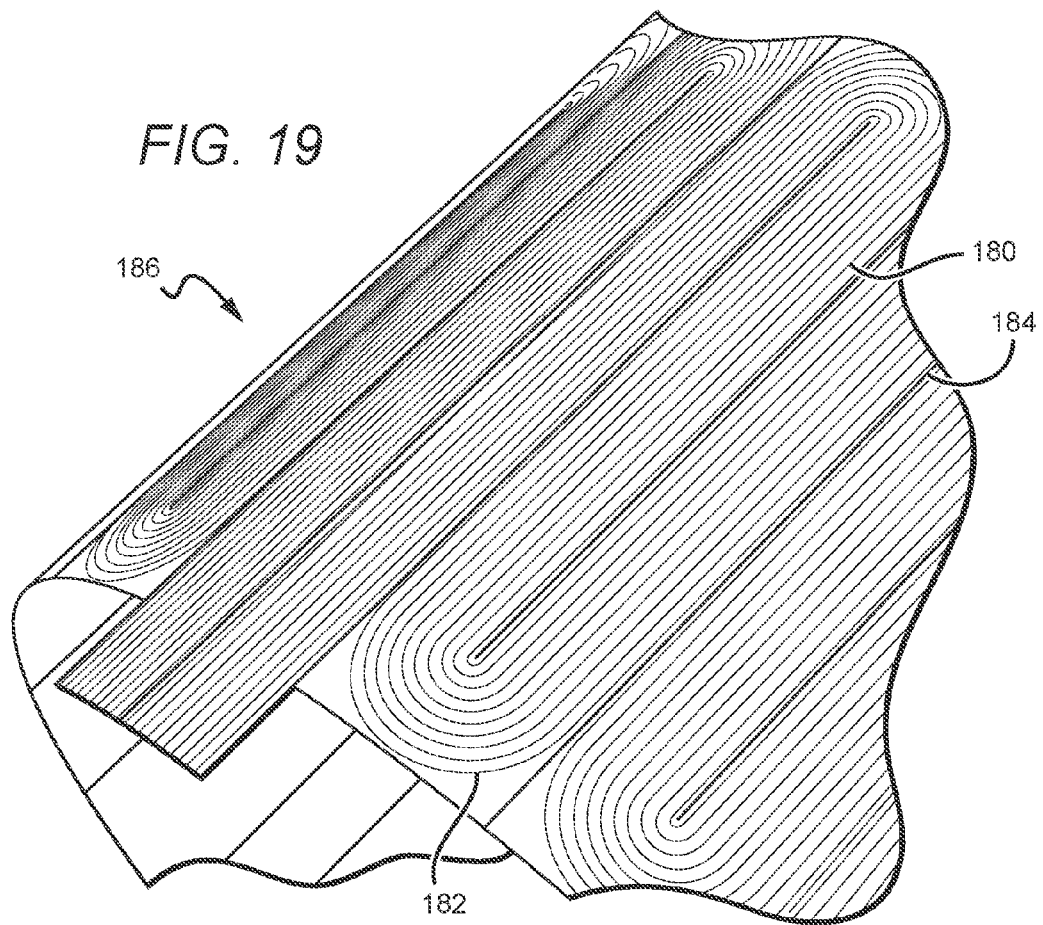

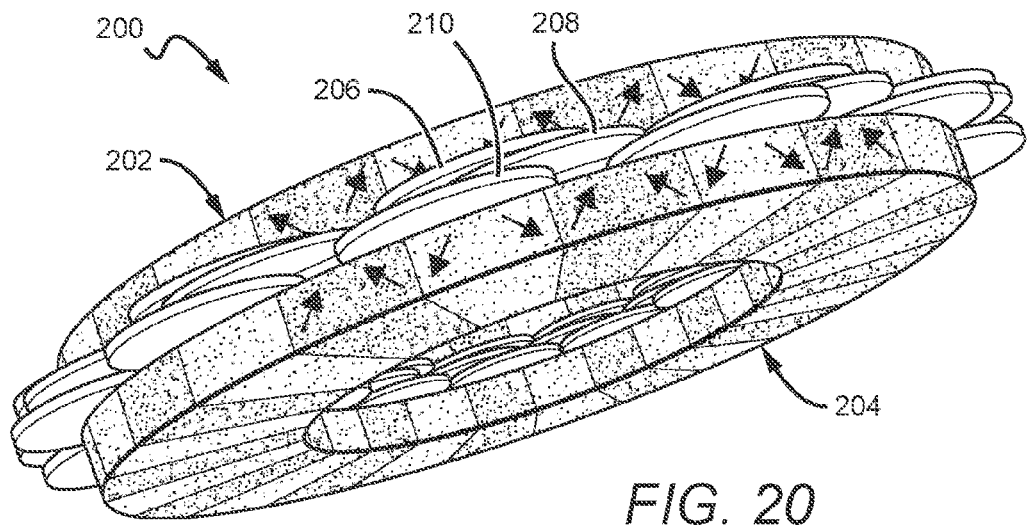
FIG. 20
FIG. 21
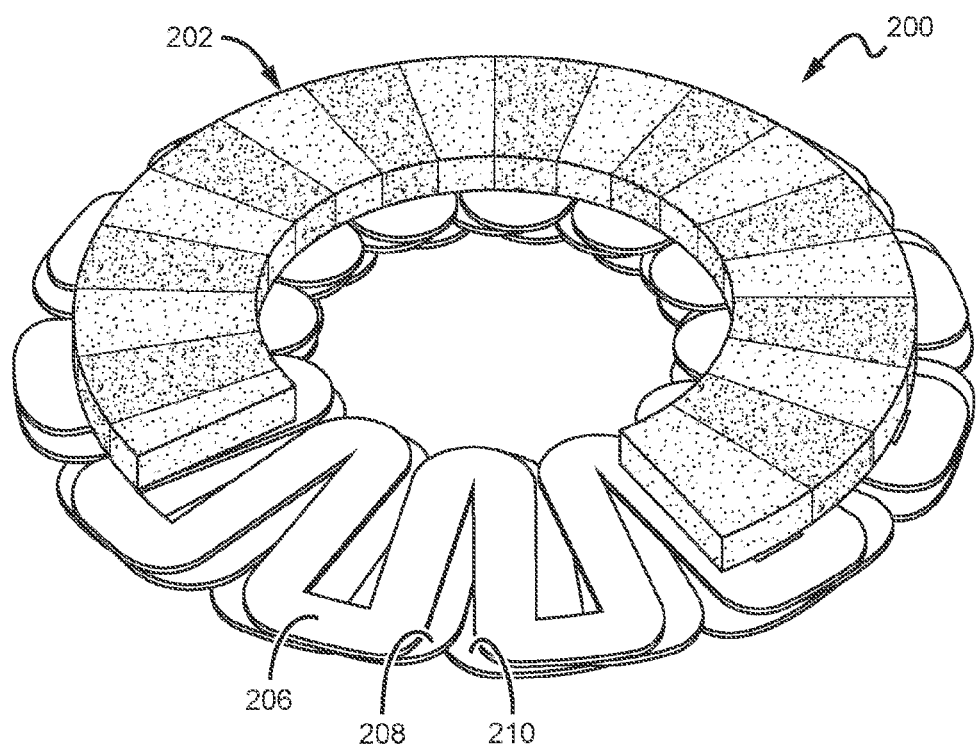

ELECTRIC MOTOR WITH LAMINATED SHEET WINDINGS

RELATED APPLICATIONS

This application claims the benefit of provisional patent application No. 62/051,235 to Gery et al., filed Sep. 16, 2014.

BACKGROUND OF THE INVENTION

Field of the Invention

This invention relates generally to electric machines, and more particularly to high-efficiency motors and generators which employ laminated sheet windings (LSWs).

Description of the Related Art

Electricity costs on a national and global scale are expected to increase considerably as the world's global requirements for energy intensify. The worst offenders for energy consumption are electric motors, which consume almost 50% of all U.S. electricity produced, according to the U.S. Department of Energy. Electric motors consume electricity values at $600 billion annually in the U.S., with the figure projected to increase to $1 trillion by 2030.

The electric motor's basic design has changed incrementally since its invention by Nikola Tesla in 1888. Current motor manufacturers have made small gains in efficiency by using improved materials and manufacturing processes, but a considerable amount of energy is still lost as heat as electricity is converted to mechanical motion. Additional energy costs may be incurred addressing heat-related issues. For example, some AC induction motors employ an electricity-consuming fan just to dissipate the considerable heat generated by the motor. As another example, high motor speeds create increasing amounts of heat, negatively impacting efficiency (as less input electrical power is converted to useable mechanical power due to heat losses).

A more efficient, cost-effective electric motor is needed to provide immediate and significant reduction in electricity consumption and associated costs.

SUMMARY OF THE INVENTION

An electric machine—suitably a motor or a generator—is presented that provides high efficiency, with a design that is more compact, lighter, and which dissipates less heat than conventional machines. Though the discussion below refers to electric motors, it is understood that electric machines including both motors and generators are contemplated.

The present electric machine employs stationary windings made from laminated sheets, and permanent magnets which are arrayed around and rotate about the windings in response to magnetic fields produced by the windings.

Numerous embodiments are described. A 'radial' embodiment employs at least one array of magnets which are magnetized radially, and at least one set of laminated sheet windings (LSWs) which are laid parallel to the motor's rotation axis and arranged such that the magnets produce a magnetic field in a plane perpendicular to the motor's rotation axis. The motor might alternatively be arranged in an 'axial' embodiment, in which at least one array of magnets are magnetized axially, and at least one set of LSWs are laid radially in the plane of the motor such that the magnets produce a magnetic field in the perpendicular axis aligned with the rotation axis. For both radial and axial embodiments, the magnet arrays may be arranged as Halbach arrays; several possible Halbach array arrangements are described.

For both radial and axial embodiments, the magnets and windings are arranged concentrically with an air gap therebetween. The motor may employ "Large Air Gap Electric Ring" (LAGER) technology, in which the air gap may be larger than those used in conventional motors, with the LSWs located within the gap.

For radial embodiments, the windings—preferably three sets (or more) so as to provide a 3-phase (or more) motor—comprise laminated metal sheets arranged radially around the motor's rotation axis to form a continuous stack of series-connected concentric metal layers; dielectric insulator layers are used to electrically insulate each metal layer from its adjacent metal layers. Cuts are preferably arranged periodically around each LSW, with each cut running parallel to the rotation axis and extending through all of the concentric metal layers, with the depth of each cut being less than the depth of the LSW and with adjacent cuts originating on opposite sides of the LSW such that the cuts form a serpentine path for current to flow as it flows around the LSW.

For axial embodiments, the windings—preferably three or more phases as discussed above—comprise laminated metal sheets laid radially in the plane of the motor—preferably following a serpentine path—to form a continuous stack of series-connected concentric metal layers, with dielectric insulator layers electrically insulating each metal layer from its adjacent metal layers.

The laminated sheets are preferably made from electrically conductive materials such as copper or aluminum. The metal density of the conductors in each winding is much higher than that provided by a conventional wire winding, resulting in higher force density.

These and other features, aspects, and advantages of the present invention will become better understood with reference to the following drawings, description, and claims.

BRIEF DESCRIPTION OF THE DRAWINGS

FIG. 3B is a close-up view of the Halbach magnet arrays shown in FIG. 3a.

FIG. 8 is a close-up view of an axial configuration of the present motor, which employs two Halbach magnet arrays.

FIG. 9a is a close-up view of a radial configuration of the present motor, which shows one set of LSWs.

FIG. 9b is a close-up view of the set of LSWs shown in FIG. 9a.

FIG. 18 is a close-up view of a LSW which includes curved c-shaped slits.

FIG. 19 is a close-up view of a LSW which includes both elongated vertical slits and curved c-shaped slits.

FIG. 20 is a close-up view of an axial configuration of the present motor, which shows three sets of LSWs laid radially in the plane of the motor.

FIG. 21 is a cutaway view of an axial configuration of the present motor, showing the serpentine path of three sets of LSWs.

DETAILED DESCRIPTION OF THE INVENTION

Figure 1:
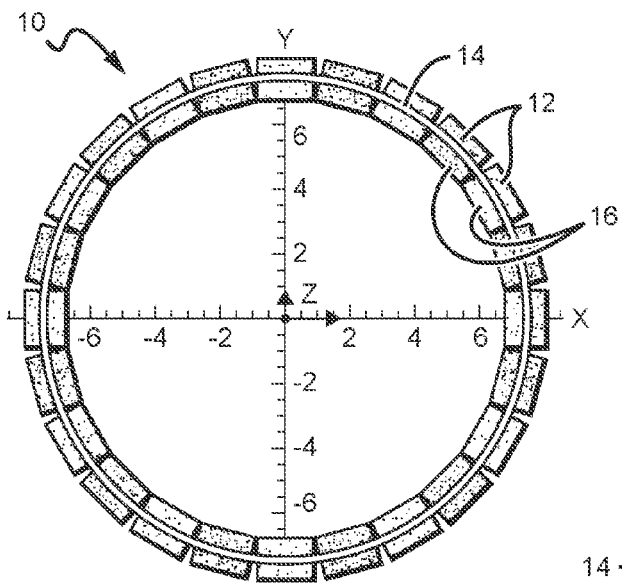
FIG. 1 is a side view of a radial configuration of the present motor.

The present motor can be provided in both 'radial' and 'axial' configurations, with several different magnet and winding variations possible within each of these. A radial configuration is illustrated in FIG. 1. The motor 10 has a corresponding rotation axis which is perpendicular to the x-y plane in which the motor lies in FIG. 1. The motor includes at least a first array of permanent magnets 12 which are magnetized radially, and at least a first set 14 of LSWs which are laid parallel to the rotation axis and are arranged such that the magnets 12 produce a magnetic field in a plane perpendicular to the rotation axis. Magnets 12 and LSWs 14 are arranged concentrically with an air gap therebetween (not visible in FIG. 1). Note that as used herein, 'depth' refers to distance as measured along an axis parallel to the rotation axis (also referred to as the 'winding axis'), and 'width' refers to distance as measured in the radial direction. The motor preferably employs LAGER technology, in which the air gap may be larger than those used in conventional motors, with the windings located within the gap.

The present motor may include a single array of magnets 12 on the outside of the first set of LSWs 14, or on the inside of the windings. The motor may also include a second array of radially magnetized permanent magnets 16, with the first and second magnet arrays on opposite sides of LSWs 14, as in FIG. 1. In operation, the LSWs 14 are stationary and the magnet array(s) rotate on the rotation axis about the windings.

Figure 2:
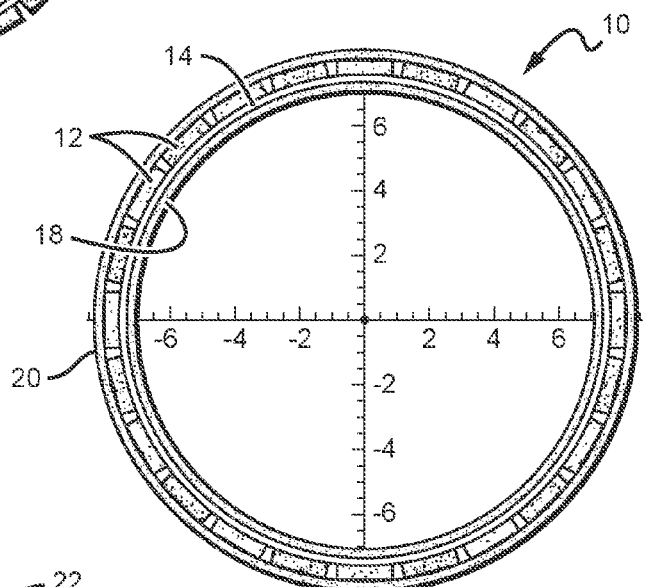
FIG. 2 is a side view of a radial configuration of the present motor which employs back-iron.

Another possible embodiment is to have the first array of magnets 12 on the outside or on the inside of LSWs 14, and to employ 'back-iron'—typically a first ferromagnetic ring 18—on the side of the windings opposite the first array of magnets; this is illustrated in FIG. 2. A second ferromagnetic ring 20 might also be used around the outer periphery of first magnet array 12 to provide additional material for the field path between magnets. The use of ferromagnetic rings enhances the magnetic flux produced by the magnets and thus enables less current to be used, which reduces motor losses. Note, however, that ferromagnetic rings may also introduce some losses due to eddy currents within the ring structure. Any type of permanent magnets may be used. The magnets may be, for example, rare earth magnets.

Figure 3A:
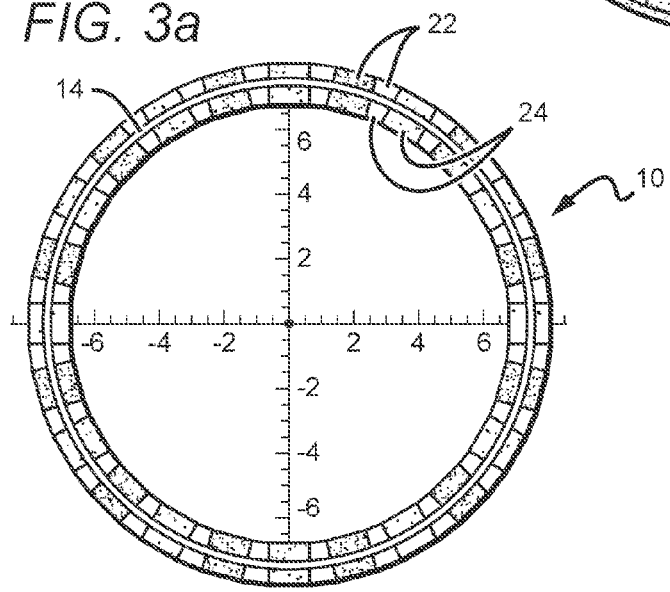
FIG. 3a is a side view of a radial configuration of the present motor which employs two Halbach magnet arrays.
Figure 3B:
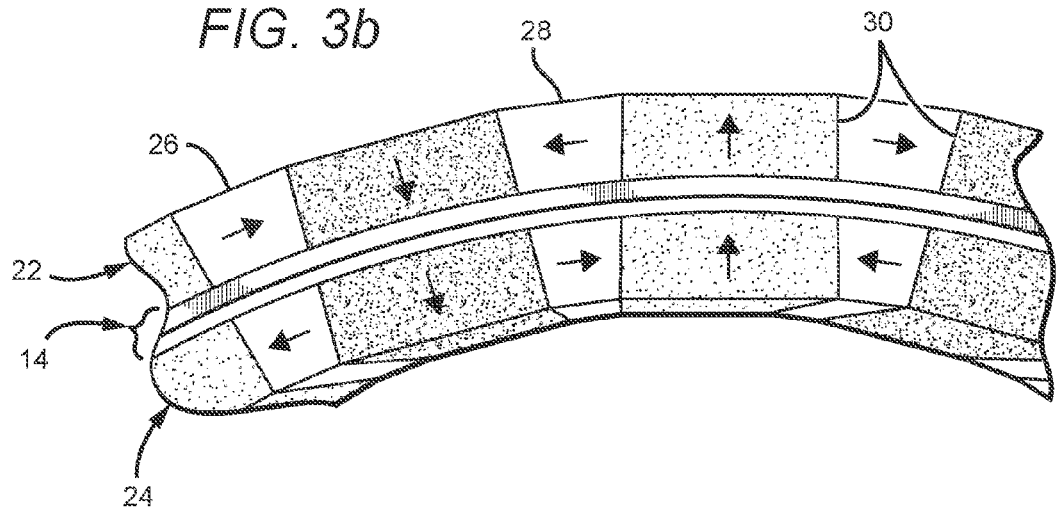

Another possible motor embodiment is shown in FIGS. 3a and 3b. Here, the magnetic field is produced by first and second magnet arrays 22, 24 provided on the outside and inside of LSWs 14, respectively, with both arrays arranged as a Halbach permanent magnet array. FIG. 3b is a close up view of the Halbach arrays shown in FIG. 3a, with the magnets' direction of magnetization indicated with arrows. When so arranged, the Halbach arrays provide the entire field magnetic path required for motor operation, which is likely to render a ferromagnetic ring (such as ring 20 in FIG. 2) unnecessary. With no iron within the magnetic path, iron losses are eliminated, and the magnet assembly can be smaller and lighter while producing higher flux density in the direction of the windings. This substantially reduces rotating mass per unit torque and power.

The individual magnets within the arrays can have many different shapes. For example, the magnets can be curved or straight wedges. In the embodiment shown in FIGS. 3a and 3b, the transverse magnets (26, 28) are in the shape of trapezoidal wedges. In other embodiments, rectangular or curved brick-shaped magnets may be used. In still other embodiments, combinations of differently-shaped magnets—such as trapezoidal, cylindrical and rectangular—can be used. The magnets are preferably joined together using a non-conductive adhesive at their interfaces 30, which helps to eliminate eddy currents from swirling across the magnet junctions. The desired magnet shape for a particular application may be selected using several methods. In one method, real-world limitations such as electrical requirements, dimensions, and cost, for example, dictate the shape of the magnet to be used in creating the array. Once the magnet shape is known, other parameters of the system may be determined.

Figure 4:
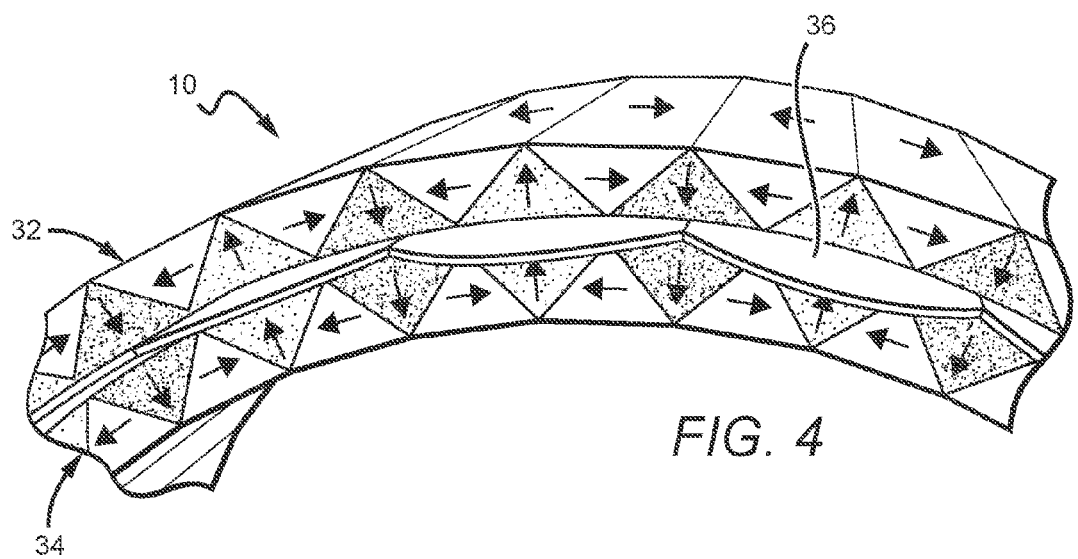
FIG. 4 is a close-up view of a Halbach magnet array configuration which employs prism-shaped magnets.

Another embodiment which employs first and second Halbach permanent magnet arrays 32, 34 on opposite sides of LSWs 36 is shown in FIG. 4. For this arrangement, referred to as a 'wedge Halbach array' (WHB), all of the magnets are in the shape of prism-shaped wedges, with each magnet having a direction of magnetization as indicated by the arrows. The angled orientation shown may provide greater magnetic flux density in the air gap than does traditional Halbach arrays. The array is arranged in an annular fashion to accommodate a rotating machine. This embodiment also employs rounded end portions on LSWs 36, which is discussed in more detail below.

Figure 5:
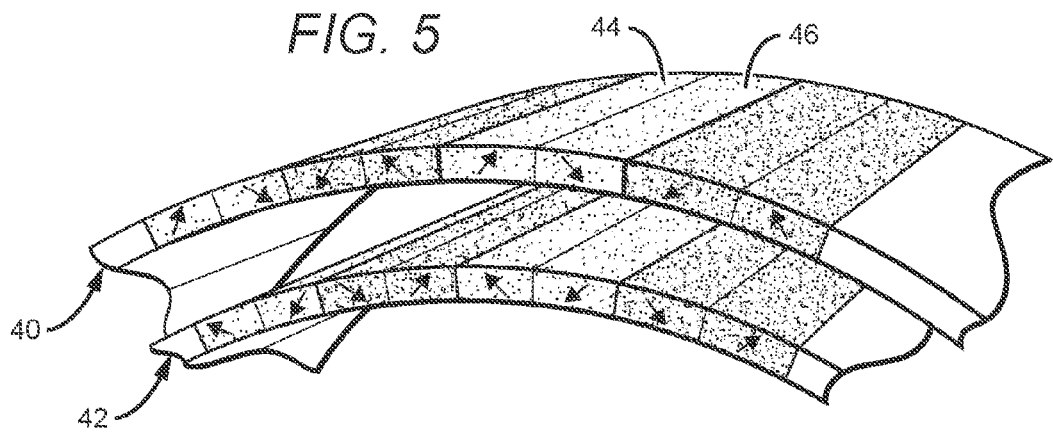
FIG. 5 is a close-up view of a magnet array configuration which employs rectangular magnets, with each magnetic pole made with two blocks magnetized at 90° with respect to each other.

Another possible radial embodiment is shown in FIG. 5. First and second arrays of magnets 40, 42 are rectangular or curved brick-shaped. Each magnetic pole comprises two blocks magnetized at 90° with respect to each other, with one of the two blocks, e.g., magnet block 44, magnetized at an angle of +45° with respect to the azimuthal direction and the other of the two blocks, e.g., magnet block 46, magnetized at an angle of −45° with respect to the azimuthal direction. Due to the rectangular shape of the magnets, this embodiment is much easier to manufacture than the prism-shaped wedge embodiment shown in FIG. 4. Using magnet blocks which each cover half a pole arc, and a magnetization pattern at ±45° from the azimuthal direction, a magnetic field density similar to that shown in FIG. 4 may be obtained. It is understood that other magnet shapes and directions of magnetization can be used to create similar field effects.

Figure 6:
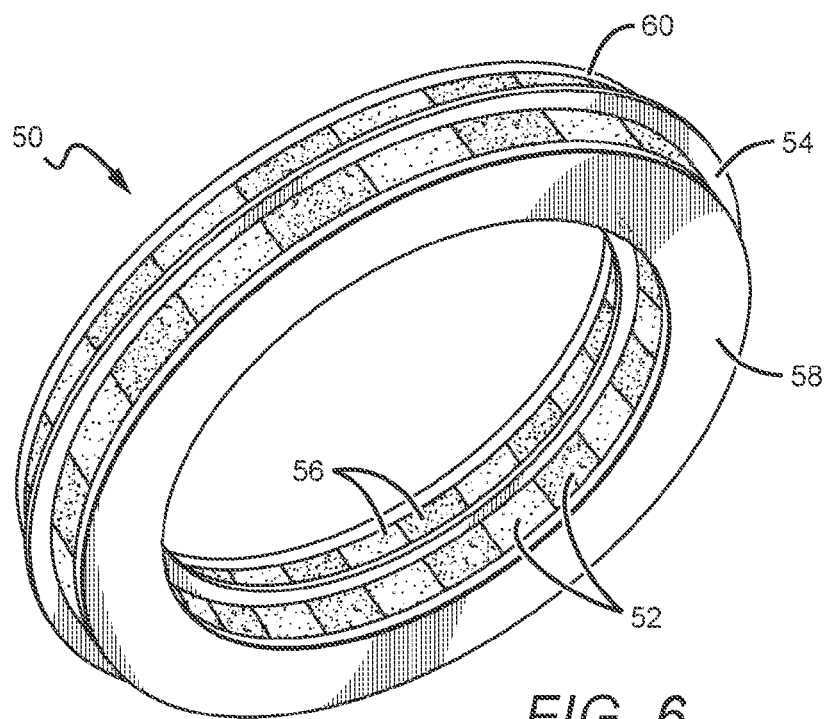
FIG. 6 is a perspective view of an axial configuration of the present motor.

An 'axial' configuration is illustrated in FIG. 6. The motor 50 has a corresponding rotation axis as above. The motor comprises at least a first array of magnets 52 which are magnetized axially, and a least a first set of LSWs 54 which are laid radially in the plane of the motor such that the magnets produce a magnetic field in the perpendicular axis aligned with the rotation axis. The magnets and LSWs are arranged concentrically with an air gap therebetween.

A motor in an axial configuration may have any of several configurations. For example, the motor may include a single array of magnets on one side of LSWs 54, and back-iron such as a ferromagnetic disk on the other side of the windings. Another possible arrangement is to have a first array of magnets on one side of the LSWs and a second array of magnets on the other side of the windings. Yet another possibility, as shown in FIG. 6, is to have a first array of magnets 52 on one said of LSWs 54, a second array of magnets 56 on the other side of the windings, and back-iron such as ferromagnetic disks 58, 60 backing each of the magnet arrays.

Figure 7:
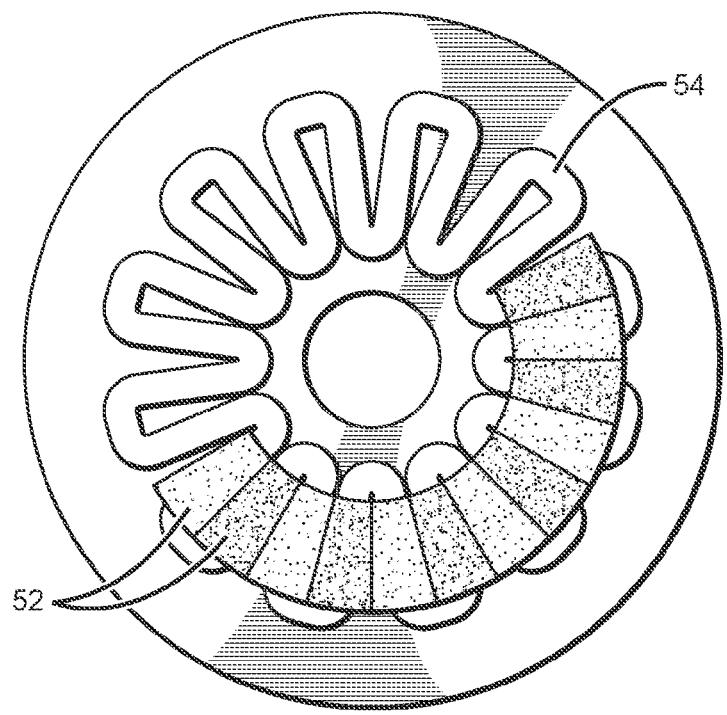
FIG. 7 is a cutaway view of an axial configuration, showing the serpentine path of the motor's laminated sheet winding (LSW).

The windings 54 can be formed into a serpentine shape; this is illustrated in FIG. 7, in which the windings are shown beneath the magnet array 52 (a portion of which is removed to reveal the windings). By so doing, current is forced to follow the serpentine path formed by the LSWs to properly engage the magnets' structure to produce torque.

Another possible axial embodiment is shown in FIG. 8. Here, a first array of magnets 62 and a second array of magnets 64 are each arranged as a Halbach array. The magnets are preferably prism-shaped wedges. Note that the magnetization directions indicated in FIG. 7 are just one possible arrangement. For example, arrays with magnetization directions of ±45° are also contemplated. As with the radial embodiments, in operation, the LSWs 54 are stationary and the magnet array(s) rotate on the rotation axis about the windings.

Details of the LSWs employed for all embodiments described herein are now described. For a radial embodiment, a first set of LSWs would comprise laminated metal sheets arranged radially around the rotation axis to form a continuous stack of series-connected concentric metal layers, with dielectric insulator layers used to electrically insulate each metal layer from its adjacent metal layers. This is illustrated in FIGS. 9a and 9b. One set of LSWs 70 is shown between magnet arrays 72 and 74 in FIG. 9a (and separated from the magnets by air gaps 75), with a close-up view of winding 70 shown in FIG. 9b. As best seen in FIG. 9b, LSW 70 comprises a continuous stack of series-connected concentric metal layers 76, with dielectric insulator layers 78 used to electrically insulate each metal layer from its adjacent metal layers. Portions 80 of LSW 70 near either end of the winding preferably extend beyond the edge of the other layers to provide an electrical connection point for the winding.

An LSW as used with the present motor suitably comprises a spiral of 15 concentric turns per phase. In one exemplary embodiment, each layer is 0.0117" thick and is coated with a dielectric insulator layer having a thickness of 0.0014". It is understood that more or fewer layers can be used and that those layers may have different thicknesses, depending on the intended application.

Figure 10:
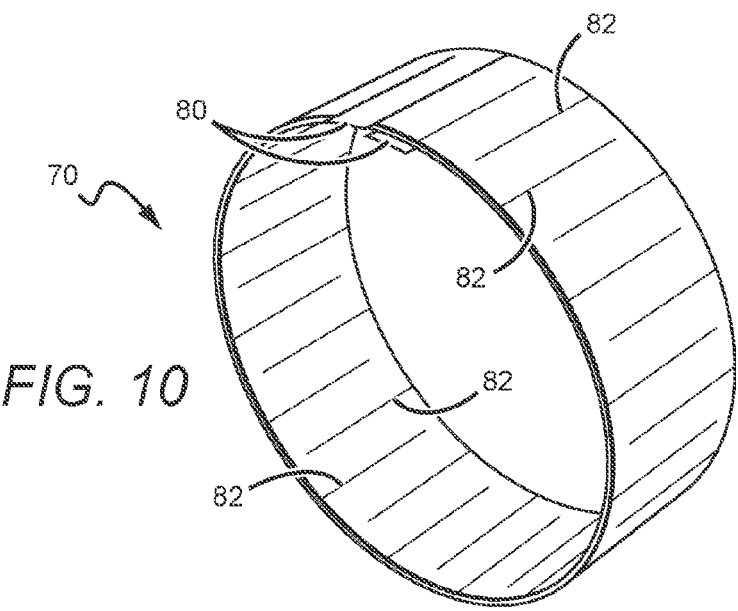
FIG. 10 is a perspective view of a LSW as might be used with a radial configuration of the present motor.

A perspective view of LSW 70 is shown in FIG. 10. As illustrated here, the windings 70 preferably further comprise cuts 82 arranged periodically around the winding, with each of the cuts running parallel to the motor's rotation axis and extending through all of the concentric metal layers. The depth of each cut is less than the depth of winding 70, with adjacent cuts originating on opposite sides of the winding such that the cuts form a serpentine path for current to flow as it flows around the winding. It is understood that other multiphase winding configurations are possible.

Figure 11:
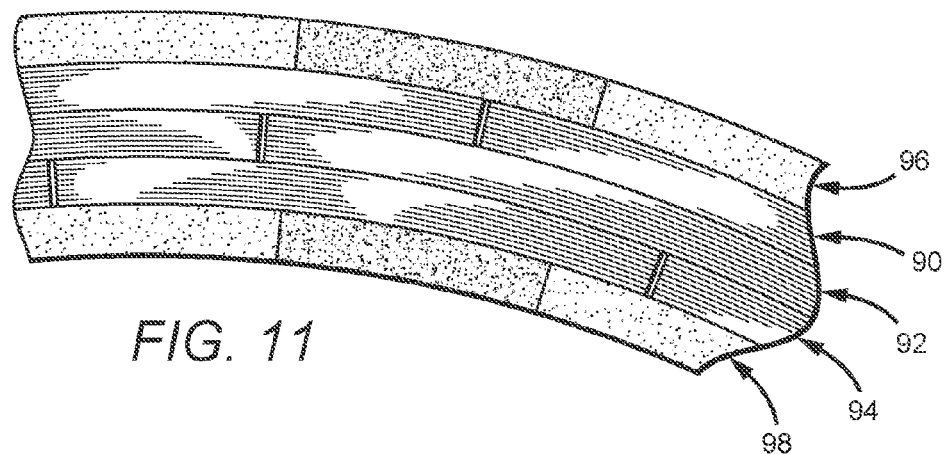
FIG. 11 is a close-up view of a radial configuration of the present motor, which shows three sets of LSWs.

Many motors are operated using three-phase AC power which is provided to three sets of windings. One possible embodiment employing three sets of LSWs for a motor in a radial configuration is shown in FIG. 11. First, second and third sets of LSWs 90, 92, 94 are stacked radially in the air gap between magnet arrays 96 and 98. Each set of LSWs is preferably constructed in the same manner as LSW 70 discussed above: i.e., as a continuous stack of series-connected concentric metal layers, with dielectric insulator layers used to electrically insulate each metal layer from its adjacent metal layers. First, second and third sets of LSWs 90, 92 and 94 provide respective winding phases for the motor. Each winding set preferably includes cuts that extend through all of the winding's concentric metal layers, as described above, such that each of the windings defines a serpentine path for current to flow as it flows around the winding.

The LSWs 90, 92, 94 are preferably rotated with respect to each other such that the cuts of the first winding are rotated by an angle which provides a phase mechanical offset equivalent to ⅔ of the width of a magnet with respect to the cuts of the second winding, and the cuts of the second winding are rotated by an angle which provides a phase mechanical offset equivalent to ⅔ of the width of a magnet with respect to the cuts of the third winding.

Magnet pitch angle is the angle covered by two adjacent magnets of opposite polarity. The widths of the magnets, $d_1$ and $d_2$, do not have to be equal. Indeed, in some embodiments the widths may be intentionally different to accommodate for the different distance of each magnet from the center of the motor. For example, $d_2$ may be greater than $d_1$ to balance out the magnetic flux of the inner and outer arrays.

One potential advantage of a winding arrangement such as that shown in FIG. 11 is that only the phase-to-phase insulation layers (×2) will have to sustain high phase-to-phase voltages.

Because each phase is located at a different radius, each phase will have a different torque. Additionally, if the field in the air gap is not uniform, another source of variation may be introduced. Embodiments of the present motor may be arranged to compensate for unequal torque produced by each phase by, for example, varying the conductor sizes (depth and arc span) and/or the number of layers in the phase, in order to balance the torque and thereby minimize the torque ripple.

Figure 12:
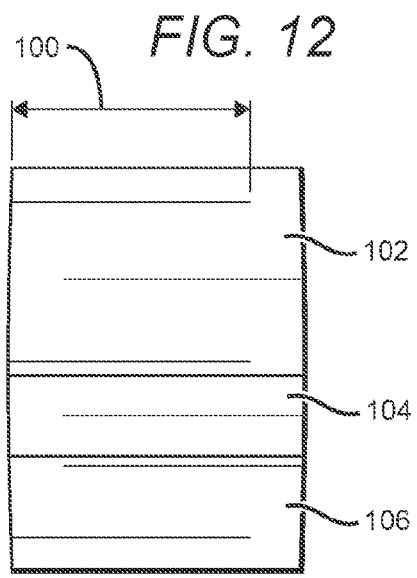
FIG. 12 is a view of a portion of three sets of LSWs, showing winding cuts as described herein.

Balancing the torque between phases may also be accomplished by varying the depth of the cuts made in the windings of each phase. This is illustrated in FIG. 12, which shows cut depth (such as cut depth 100) for each of the three sets of windings 102, 104 and 106. The depths of the cuts defining the winding serpentine for each phase can also be adjusted to shape the back EMF (voltage) waveform, which can provide improved efficiency. The ratio of the depth of the permanent magnet arrays to the depth of the winding cuts may also be varied to achieve a particular desired characteristic.

Figure 13:
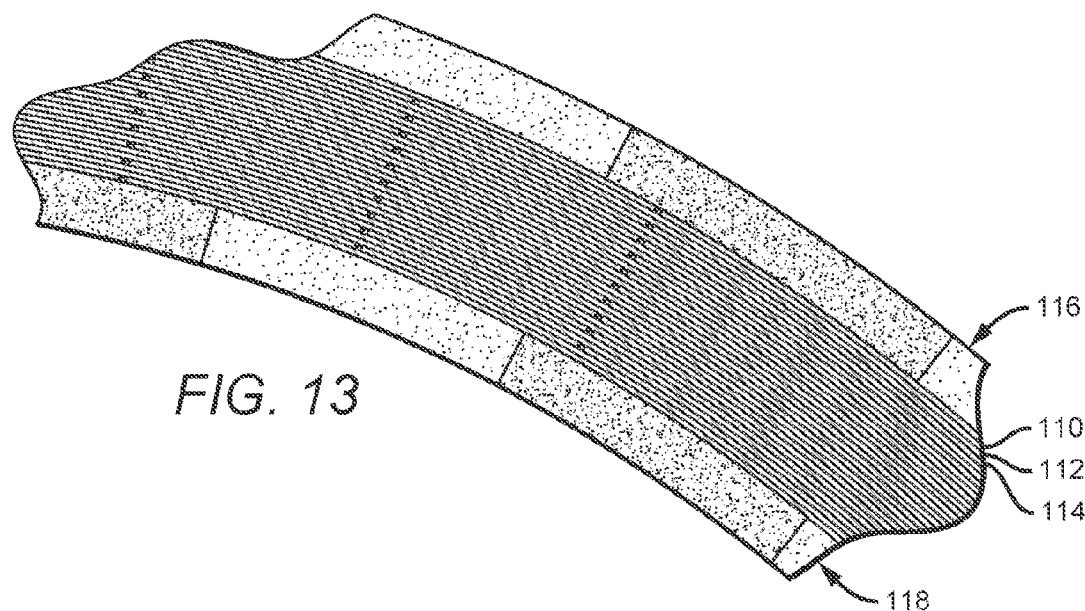
FIG. 13 is a close-up view of a radial configuration of the present motor, which shows three sets of LSWs that are interleaved.

In another possible LSW embodiment for a radial configuration motor, the phase layers 110, 112, 114 are interleaved between magnet arrays 116, 118 as shown in FIG. 13. This results in quasi-identical phases, and thus may avoid the need to make cuts in the windings as described above, which can be a difficult manufacturing challenge.

Figure 14:
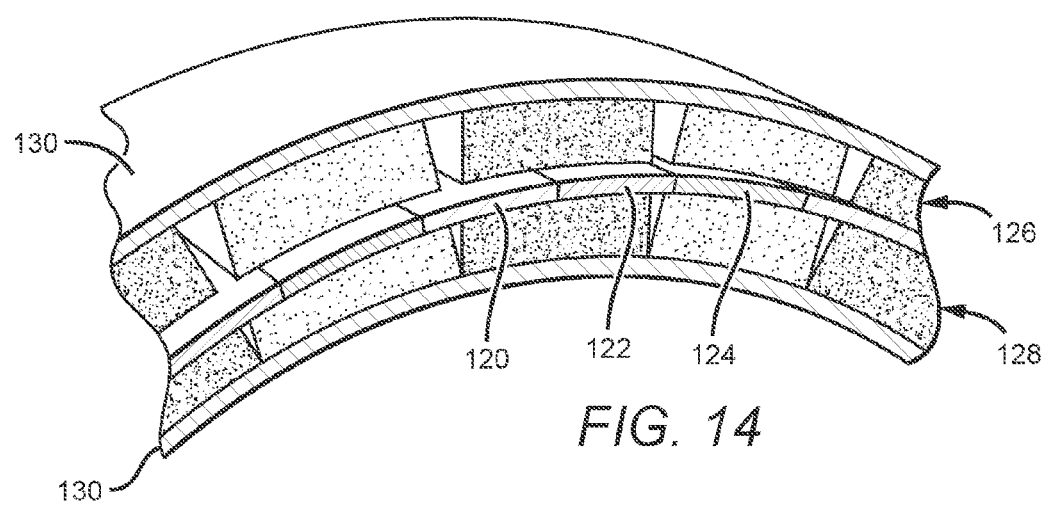
FIG. 14 is a close-up view of a radial configuration of the present motor, which shows three sets of LSWs stacked azimuthally.

Another LSW embodiment is shown in FIG. 14, which provides a half view of the motor. Here, the three phases (120, 122, 124) are stacked azimuthally in the air gap and between magnet arrays 126 and 128 (which includes ferromagnetic rings 130 in this exemplary embodiment). This is referred to as a 'cage' winding, for which current flows from one side of the cage to the other.

Figure 15:
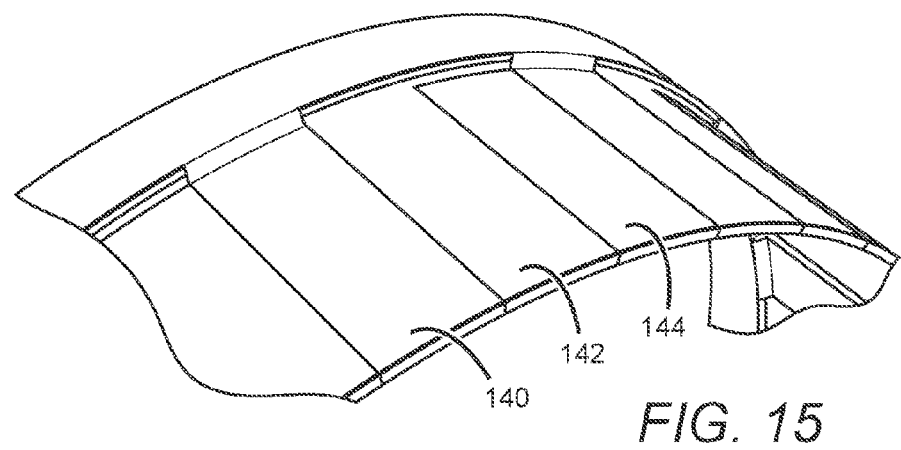
FIG. 15 is a close-up view of another possible embodiment of a radial configuration of the present motor, which shows three sets of LSWs stacked azimuthally.

FIG. 15 shows another embodiment in which the three phases 140, 142, 144 are stacked azimuthally (magnet arrays not shown). The three winding sets might also be arranged in a spiral pattern, with the laminated metal sheets making up each winding continuously rolled with a dielectric layer.

Figure 16A:
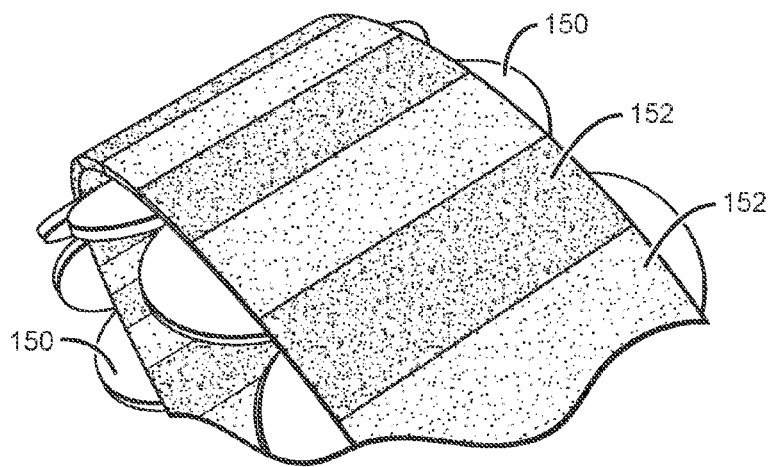
FIG. 16a is a close-up view of a radial configuration of the present motor, which shows a set of LSWs having a depth which exceeds that of the magnet arrays.
Figure 16B:
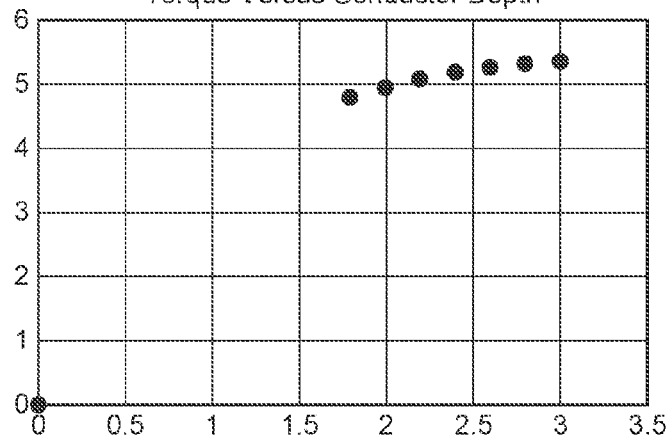
FIG. 16b is a graph of torque versus conductor depth.

As illustrated in FIG. 16a, the LSWs 150 may be provided with a depth that exceeds that of the magnets 152; a graph of LSW conductor depth versus torque is shown in FIG. 16b. The portions of LSWs 150 extending beyond magnets 152 are preferably rounded. Reducing the conductor depth with respect to the magnet depth improves efficiency by reducing the conductors' AC resistance without sacrificing mechanical output. In some embodiments, the winding ends will simply be straight edges. The winding ends of the embodiment shown in FIG. 16a are rounded to reduce the total amount of material required to manufacture the windings. The rounded ends eliminate material from the straight end windings, where current would not be flowing in any event. Additionally, the exposed rounded winding ends can also serve as a heat sink to dissipate thermal energy into the ambient air surrounding the motor. In one embodiment, a housing comprising slot features uses the rotational motion of the machine to create an airflow over the winding ends to facilitate thermal dissipation; this is discussed in more detail below.

Figure 17:
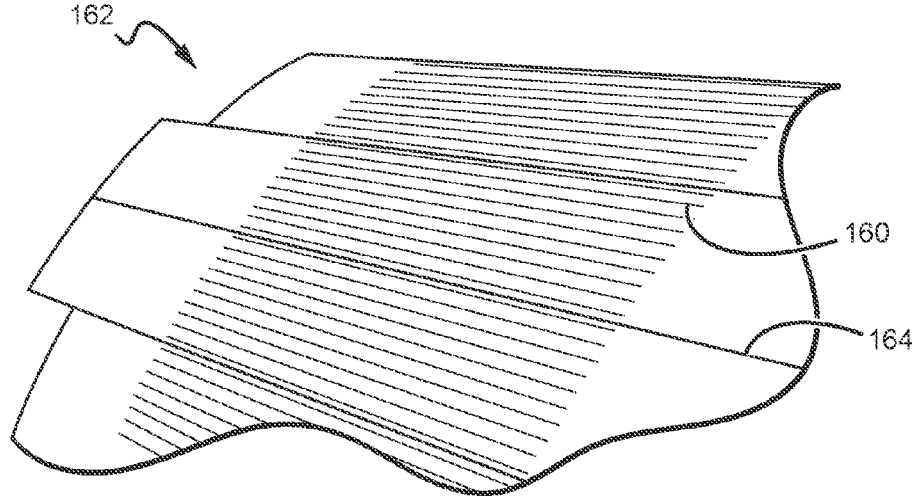
FIG. 17 is a close-up view of a LSW which includes elongated vertical slits.

Introducing slits throughout the windings will improve efficiency by reducing the eddy currents induced within the LSWs. Several different slit orientations and dimensions are possible. For example, as shown in FIG. 17, elongated linear slits 160 can be made through LSW 162 along the winding axis to reduce eddy currents induced within the windings. FIG. 17 also illustrates the use of cuts 164 as described above. The number and length of the slits may be adjusted depending on the requirements of a particular application.

In another embodiment shown in FIG. 18, curved c-shaped slits 170 can be positioned near the ends of LSW 172 to encourage current flow around the primary cuts 174, and thereby reduce eddy currents. The number of curved slits and the length of the straight portion of the slits can be adjusted as necessary for a particular application.

In yet another embodiment, a combination of elongated linear slits 180 and curved c-shaped slits 182 around cuts 184 can be made in LSW 186, as shown in FIG. 19. Here, at least some of the slits follow the serpentine path created by the cuts to encourage current flow around the cuts.

LSWs suitable for an axial configuration of the present motor is shown in FIG. 20. Motor 200 comprises at least a first array of magnets which are magnetized axially, and at least a first set of LSWs which are laid radially in the plane of the motor such that the magnets produce a magnetic field in the perpendicular axis aligned with the rotation axis. The magnets and LSWs are arranged concentrically with an air gap therebetween.

The exemplary embodiment shown in FIG. 20 includes an array of magnets 202, 204 on each side of the LSWs, which here comprises first, second and third sets of LSWs 206, 208 and 210. Each set of windings comprises laminated metal sheets laid radially in the plane of motor 200 to form a continuous stack of series-connected concentric metal layers, and dielectric insulator layers which electrically insulate each metal layer from its adjacent metal layers.

Windings 206, 208 and 210 are preferably offset from each other as shown in FIG. 20. Though not essential, the magnet arrays 202 and 204 preferably have a magnetization pattern of ±45° from the azimuthal direction.

The windings for an axial configuration of the motor are preferably laid radially in the plane of the motor such that they follow a serpentine path. This is illustrated in FIG. 21, which has a portion of top side magnet array 202 removed to reveal the three serpentine windings 206, 208 and 210 interposed between the two magnet arrays.

The windings may be fabricated using various electrically conductive materials. Some suitable materials include copper, aluminum, gold, and silver, for example; other conductive materials might also be used. The metal density of the conductors in each LSW is much higher than that provided by a conventional wire winding, resulting in higher force density. Volume and weight are reduced relative to current input and torque output.

The LSWs may be fabricated using a subtractive process where the slits are cut into a base winding material, using a saw or a laser, for example. The LSWs may also be fabricated using an additive process, such as 3-D printing, (for example.)

Figure 22:
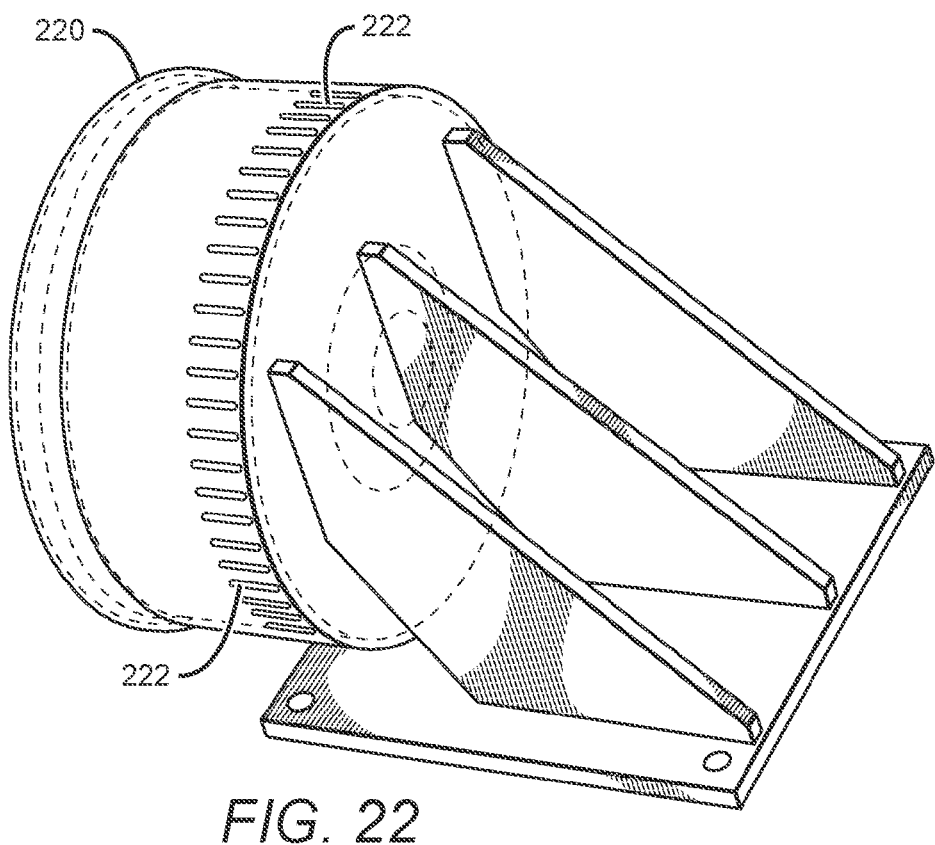
FIG. 22 is a perspective view of a motor housing with vents as might be used with the present motor.

Various cooling features are contemplated for the present motor. In the embodiment shown in FIG. 22, the motor is within a housing 220 which has vents 222 that may be designed to take air into the housing interior and pass it over internal elements (e.g., the LSWs and magnet arrays) to aid thermal dissipation from the motor. The vents may also be designed to expel air out of the housing.

Figure 23:
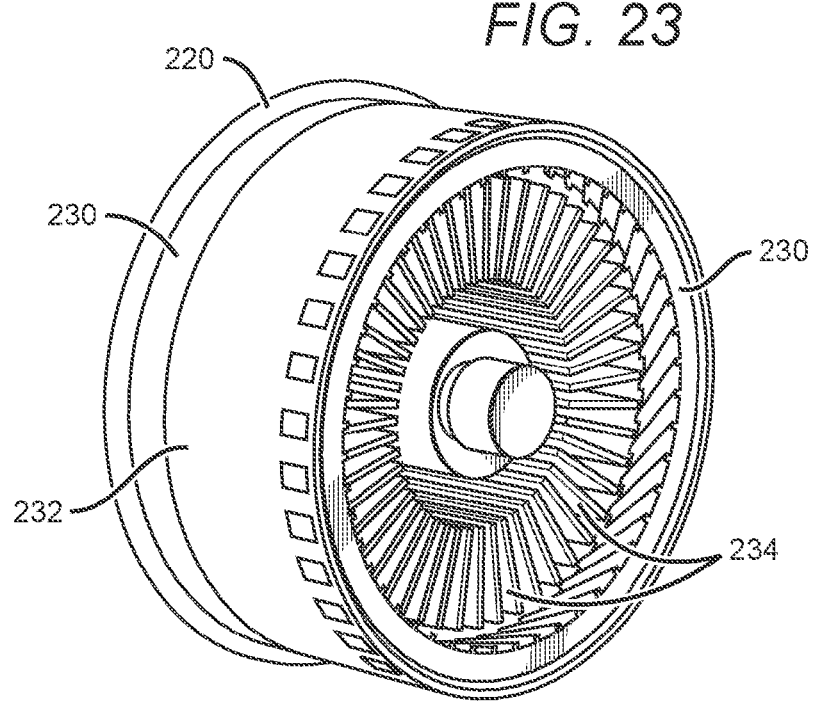
FIG. 23 is a perspective view of the present motor which includes a fan blade feature.

In the embodiment shown in FIG. 23, which has most of housing 220 removed to reveal the motor within, a rotor 230 rotates within stator 232, with fan blades 234 arranged to spin with the rotor to force hot air produced near the windings out of the housing.

Embodiments of the present motor would be driven with electrical signals using techniques that are well-known to those with knowledge of electric motors. Motors may be configured as any of a number of motor types, including brushless AC and brushless DC arrangements. Best performance is achieved when three sets of windings are employed in a 3-phase motor, as described herein, which are driven with a 3-phase AC signal. Other multi-phase windings are possible.

An embodiment which combines high metal density in the LSWs and at least one Halbach magnet array results in a very significant motor torque and power increase per unit weight and size. This further translates into a simpler motor design with reduced cooling requirements, much less material used per unit power, and higher efficiency than conventional motor designs. Motor balancing is simpler with lower rotation mass. Bearings and structures are reduced in size and mass, further optimizing the overall design. Installation requirements are minimized due to low mass and small size. With extremely high flux density in both the magnetic array and the LSW, torque is considerably higher per unit volume and mass than conventional designs. Acceleration is much higher, and efficiency losses due to acceleration are greatly reduced, especially for motors used in multi-speed applications, such as vehicles.

The LSW technology described herein lends itself to additive manufacturing and advanced materials, giving design freedom not available with conventional manufacturing technologies. LSWs can be produced with state-of-the-art deposition methods to further optimize manufacturability and eliminate the need for complex winding machines and manual winding steps.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. An electric machine having a corresponding rotation axis, comprising:
    a first array of magnets which are magnetized radially; and
    a first set of laminated sheet windings (LSWs) which are laid parallel to said rotation axis and arranged such that said magnets produce a magnetic field in a plane perpendicular to said rotation axis, said magnets and LSWs arranged concentrically with an air gap therebetween,
    wherein said first set of LSWs comprise cuts arranged periodically around the LSWs.

2. The electric machine of claim 1, wherein said first array of magnets are on the outside of said first set of windings.

3. The electric machine of claim 1, wherein said first array of magnets are on the inside of said first set of windings.

4. The electric machine of claim 1, wherein said first array of magnets are on the outside or on the inside of said first set of windings, further comprising a first ferromagnetic ring on the side of said windings opposite said first array of magnets.

5. The electric machine of claim 4, further comprising a second ferromagnetic ring around the periphery of said first array of magnets.

6. The electric machine of claim 1, wherein said first array of magnets are rare earth magnets.

7. The electric machine of claim 1, further comprising a second array of magnets which are magnetized radially, said first and second arrays of magnets on the inside and on the outside of said first set of windings, respectively.

8. The electric machine of claim 7, wherein said first array of magnets and said second array of magnets are each arranged as a Halbach array.

9. The electric machine of claim 8, wherein at least some of said magnets are in the shape of trapezoidal wedges.

10. The electric machine of claim 8, wherein said magnets are in the shape of prism-shaped wedges.

11. The electric machine of claim 8, wherein said magnets are curved or straight wedges.

12. The electric machine of claim 8, wherein said first array of magnets and said second array of magnets are rectangular or curved bricks, with each magnetic pole comprising two blocks with one of said two blocks magnetized at an angle of +45° with respect to the azimuthal direction and the other of said two blocks magnetized at an angle of −45° with respect to the azimuthal direction.

13. The electric machine of claim 1, wherein said windings are stationary and said magnets rotate on said rotation axis about said windings.

14. The electric machine of claim 1, wherein adjacent ones of said magnets are joined together using a non-conductive adhesive at their interface.

15. The electric machine of claim 1, wherein said machine employs "Large Air Gap Electric Ring" (LAGER) technology.

16. The electric machine of claim 1, further comprising additional sets of LSWs, each of which are laid parallel to said rotation axis, said first and said additional sets of LSWs comprising multi-phase LSWs which provide respective winding phases for said machine.

17. The electric machine of claim 16, wherein said first and said additional sets of LSWs comprise first, second and third sets of LSWs.

18. The electric machine of claim 16, wherein said multi-phase LSWs are stationary and said magnets rotate on said rotation axis about said LSWs.

19. The electric machine of claim 1, wherein said electric machine is an electric motor or a generator.

20. An electric machine having a corresponding rotation axis, comprising:
    a first array of magnets which are magnetized radially; and
    a first set of laminated sheet windings (LSWs) which are laid parallel to said rotation axis and arranged such that said magnets produce a magnetic field in a plane perpendicular to said rotation axis, said magnets and LSWs arranged concentrically with an air gap therebetween;
    said first set of LSWs comprising:
        cuts arranged periodically around the LSWs;
        laminated metal sheets arranged radially around said rotation axis to form a continuous stack of series-connected concentric metal layers; and
        dielectric insulator layers which electrically insulate each metal layer from its adjacent metal layers.

21. The electric machine of claim 20, each of said cuts running parallel to said rotation axis and extending through all of said concentric metal layers, the depth of each cut being less than the depth of said winding with adjacent cuts originating on opposite sides of said winding such that said cuts form a serpentine path for current to flow as it flows around said winding.

22. The electric machine of claim 20, further comprising additional sets of LSWs, each comprising:
    laminated metal sheets arranged radially around said rotation axis to form a continuous stack of concentric series-connected metal layers; and
    dielectric insulator layers which electrically insulate each metal layer from its adjacent metal layers;
    said first and said additional sets of LSWs providing respective winding phases for said electric machine.

23. The electric machine of claim 22, wherein said first and said additional sets of LSWs comprise first, second and third sets of LSWs.

24. The electric machine of claim 22, wherein each of said first and said additional sets of windings further comprises cuts arranged periodically around said winding, each of said cuts running parallel to said rotation axis and extending through all of said concentric metal layers, the depth of each cut being less than the depth of said winding with adjacent cuts originating on opposite sides of said winding such that said cuts form a serpentine path for current to flow as it flows around said winding.

25. The electric machine of claim 24, wherein said LSWs comprise first, second and third sets of LSWs, said LSWs rotated with respect to each other such that the cuts of said first winding are rotated by an angle which provides a phase mechanical offset equivalent to ⅔ of the width of a magnet with respect to the cuts of said second winding, and the cuts of said second winding are rotated by an angle which provides a phase mechanical offset equivalent to ⅔ of the width of a magnet with respect to the cuts of said third winding.

26. The electric machine of claim 24, wherein the depths of the cuts in each set of windings are adjusted as needed to balance the torque between phases.

27. The electric machine of claim 24, wherein the depths of the cuts in each set of windings are adjusted as needed to shape the back EMF (voltage) waveform.

28. The electric machine of claim 24, wherein the ratio of the depth of the permanent magnet arrays to the depth of said cuts is selected to provide a particular desired characteristic.

29. The electric machine of claim 22, wherein said first and said additional sets of LSWs are stacked radially in said air gap to provide concentric nested phases for said electric machine.

30. The electric machine of claim 22, wherein said first and said additional sets of windings are interleaved.

31. The electric machine of claim 22, wherein said first and said additional sets of windings are stacked azimuthally.

32. The electric machine of claim 22, wherein said first and said additional sets of LSWs are each arranged in a spiral pattern, with the laminated metal sheets making up each winding continuously rolled with a dielectric layer.

33. The electric machine of claim 20, wherein said laminated metal sheets comprise electrically conductive materials selected from a group which includes copper, aluminum, gold, and silver.

34. The electric machine of claim 20, wherein the depth of said first set of LSWs periodically exceed the depth of said first array of magnets, the portions of said windings extending beyond said first array of magnets being rounded.

35. The electric machine of claim 20, further comprising elongated linear slits through said laminated metal sheets along the axis of said first winding, to reduce eddy currents induced within said first set of LSWs.

36. The electric machine of claim 20, wherein said first set of LSWs further comprises cuts arranged periodically around said winding, each of said cuts running parallel to said rotation axis and extending through all of said concentric metal layers, the depth of each cut being less than the depth of said winding with adjacent cuts originating on opposite sides of said winding such that said cuts form a serpentine path for current to flow as it flows around said winding;
    further comprising curved c-shaped slits through said laminated metal sheets and around said cuts to encourage current flow around said cuts.

37. The electric machine of claim 20, wherein said first set of LSWs further comprises cuts arranged periodically around said winding, each of said cuts running parallel to said rotation axis and extending through all of said concentric metal layers, the depth of each cut being less than the depth of said winding with adjacent cuts originating on opposite sides of said winding such that said cuts form a serpentine path for current to flow as it flows around said winding;
    further comprising elongated slits and curved c-shaped slits through said laminated metal sheets to encourage current flow around said cuts.

38. The electric machine of claim 20, wherein said LSWs are stationary and said magnets rotate on said rotation axis about said windings.

39. The electric machine of claim 20, wherein said electric machine is an electric motor or a generator.

40. An electric machine having a corresponding rotation axis, comprising:
    a first array of magnets which are magnetized radially; and
    a first set of laminated sheet windings (LSWs) which are laid parallel to said rotation axis and arranged such that said magnets produce a magnetic field in a plane perpendicular to said rotation axis, said magnets and LSWs arranged concentrically with an air gap therebetween;
    a housing, said magnets and windings contained within said housing; and
    vents in said housing through which air can be provided to and hot air exhausted from said magnets and windings,
    wherein said first set of LSWs comprise cuts arranged periodically around the LSWs.

41. The electric machine of claim 40, wherein said magnets are said motor's rotor, further comprising fan blade features coupled to rotate with said rotor to force hot air out of said housing.

* * * * *